United States Patent

[11] 3,563,442

| [72] | Inventor | Gerald L. Kretchman |
| | | Saint Joseph, Mich. |
| [21] | Appl. No. | 772,324 |
| [22] | Filed | Oct. 31, 1968 |
| [45] | Patented | Feb. 16, 1971 |
| [73] | Assignee | The Bendix Corporation |

[54] COMBINATION LIP SEAL AND O-RING
5 Claims, 3 Drawing Figs.

[52] U.S. Cl. .................................................. 227/208
[51] Int. Cl. .................................................. F16j 9/20
[50] Field of Search .......................................... 277/205--211

[56] References Cited
FOREIGN PATENTS

| 190,550 | 7/1964 | Sweden .................... | 277/207A |
| 992,123 | 5/1965 | Great Britain ............. | 277/205 |

*Primary Examiner*—Laverne D. Geiger
*Assistant Examiner*—Robert I. Smith
*Attorneys*—Richard G. Geib and Plante, Arens, Hartz, Hix & Smith ABSTRACT: A unique seal is disclosed for use between the piston and cylinder of a fluid motor. A stepped groove is provided in the outer surface of the piston which is defined by inner and intermediate circumferentially extending surfaces. The seal includes a base section disposed in the section of the groove defined by the inner surface, a lip section extending axially from the base section into the section of the groove defined by the intermediate surface, and another section that extends radially from the base section engaging the wall of the bore. The corner defined by the junction of the inner and intermediate surfaces engages one side of the lip section to urge the other side of the latter into sealing engagement with the wall of the bore.

PATENTED FEB 16 1971 3,563,442
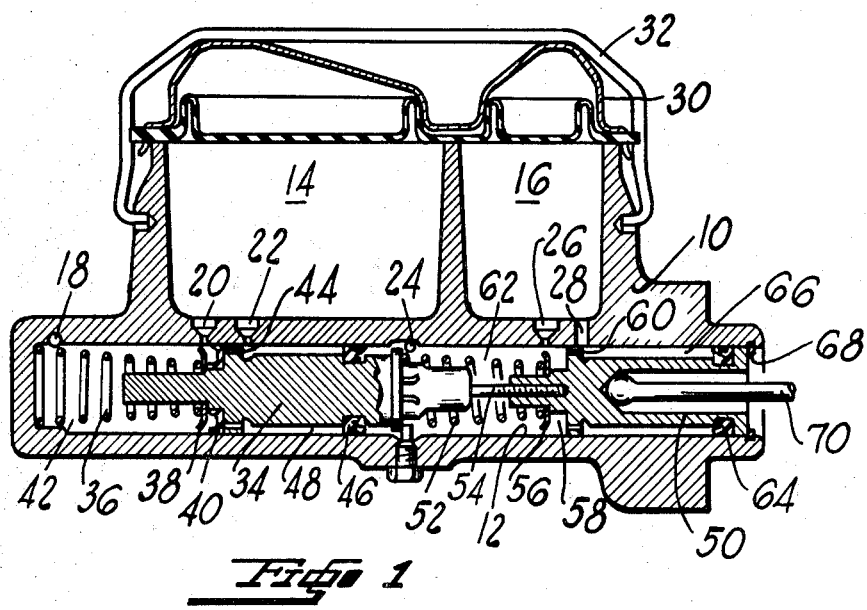
Fig. 1
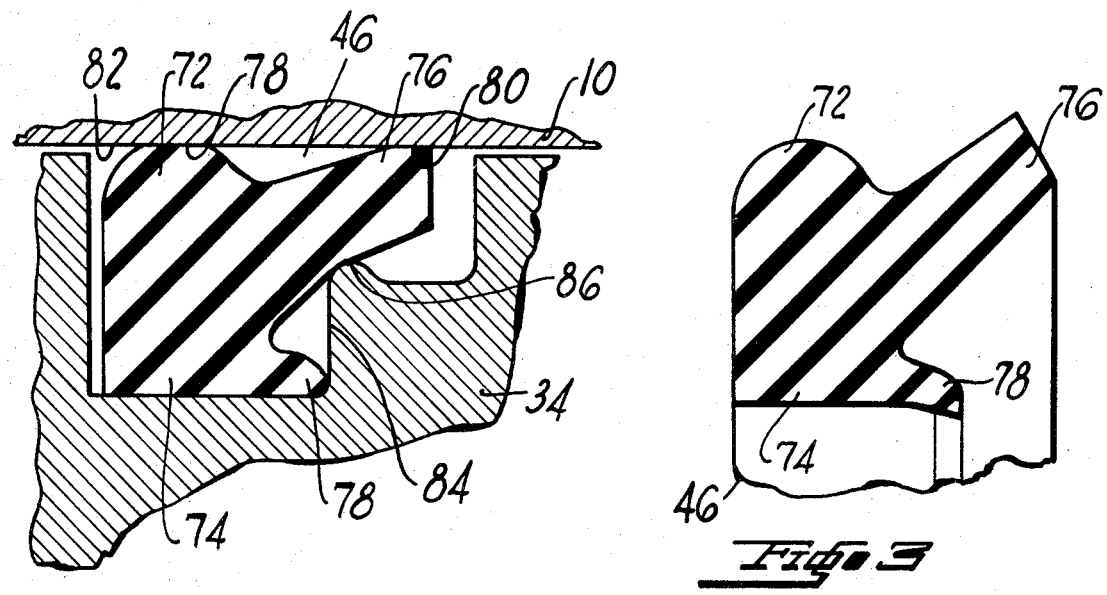
Fig. 2
Fig. 3
INVENTOR.
GERALD L. KRETCHMAN
BY
Richard G. Geib
ATTORNEY

COMBINATION LIP SEAL AND O-RING

SUMMARY

Prior art attempts to provide an improved seal by having a combination of the types of seals in one, such as is illustrated by prior art U.S. Pat. No. 3,189,359 have essentially limited their efforts to a combination of the O-ring sealing features with lip sealing means in the form of a Quad Ring. Such seals have been noted to have some problems, namely the problem of inversion during assembly, which for the most part is not caught and thus provides leaking hydraulic apparatus in the field. Furthermore it has been observed that such seals do not provide an insured sealing contact between the contiguous surfaces due to the resilience in the O-ring portions in instances where there is tolerance variables between the contiguous surfaces which the designer must take into account. In other words, it has been observed that, with such seals as illustrated by the aforementioned patent, if the designer takes into consideration the maximum tolerance variables for the contiguous surfaces in order to provide reasonable sealing contact under any tolerance variations, there can be reasonably predicted there will either result a problem of seal friction or sealing per se because of the resiliency of the O-ring portions of the seal not presenting a true or constant compression factor of a predictable nature. It is, therefore, a principal object of this invention to improve a seal by providing the cross-sectional profile which will insure a positive sealing relationship with the contiguous surfaces while maintaining limited seal friction opposing the movement of one or both of the surfaces with the seal interposed.

A further and more detailed object of this invention is to provide a combination seal that has an O-ring over a square section with a lip seal provision projecting therefrom with the terminal points of the lips extending above and/or below the O-ring and square sections, respectively.

It is still a further object of this invention to provide such a seal as aforementioned with a lip sealing means that is flared into the O-ring and square sections so as to axially reinforce the ring type seal and thereby prevent its inversion during assembly automatically.

A still further and important object of this invention is to provide such a seal as aforementioned that is installed so as to be compressed only in the radial direction to provide a lesser area of contact in the O-ring portion of the seal to insure a predictable seal friction for that portion, and provide a maximum gripping for the seal via a square section and limited area lip portion contacting the bottom of a groove to insure the stability of the seal in the one member so grooved to receive it.

DRAWING DESCRIPTION

Other objects and advantages will most certainly appear to those skilled in the art to which this invention relates from the following description of the drawings in which:

FIG. 1 is a cross-sectional illustration of a vehicle brake master cylinder incorporating the seal in accordance with the principles of this invention;

FIG. 2 is an enlarged partial cross-sectional view of the sealing means in accordance with the principles of this invention as installed in the master cylinder secondary piston of FIG. 1 showing its relationship in the assembled attitude between the contiguous surfaces, namely the bore wall and the secondary piston; and FIG. 3 is a cross-sectional illustration of the profile of the seal means in accordance with the principles of this invention in its relaxed, noninstalled, attitude.

DETAILED DESCRIPTION

With reference now to FIG. 1 there is shown a master cylinder comprising a housing 10 that is machined to have a bore 12, reservoir cavity 14 and 16 and ports 18, 20, 22, 24, 26 and 28. The reservoir is closed by a sealing cap structure 30 that is held on to the housing 10 by means of a bail 32. Within the bore 12 a secondary piston 34 is first inserted with its return spring 36 to abut the end of the bore 12. A return spring overlies a combination spring bearing plate and seal retainer 38 for a primary seal 40 of a lip seal construction so as to seal a secondary chamber 42 at the end of the bore 12 while providing communication via passages 44 in the secondary piston around the lip seal 40 thereinto from the filler port 22.

The secondary piston 34 is provided with a secondary seal 46 cooperating with the walls of the bore 12 to provide an annular chamber 48 between the seals 40 and 46 along the secondary piston 34.

Next a primary piston 50 is inserted into the bore with its caged spring 52 adjustable by means of bolt 54 abutting the secondary piston 40. The cage spring 54 cooperates with a combination seal retainer and bearing plate 56 to position primary seal 58 adjacent the forward face of the piston 50 overlying passages 60 similar to passages 44 of secondary piston 34 whereby a primary chamber 62 is crated between the pistons 34 and 50 that may be filled via the port 28, passages 60 and around the lip portions of seal 58. Piston 50 has a secondary seal 64 incorporating the novel configuration of this invention on its trailing portion to provide an annular chamber 66 similar to the annular chamber 48 around the secondary piston 34. Seal 64 permits vacuum bleeding of the master cylinder bore 12 due to the facing of its lip portion inwardly.

The spring 36 is then compressed to permit the installation of a snap ring 68 to maintain the assembly of the pistons 34 and 50 within the bore 12 of the master cylinder such that the faces of the lip seals 40 and 58 for the secondary piston 34 and primary piston 50, respectively, terminate immediately behind the drilled opening of ports 20 and 26, respectively, from reservoirs 14 and 16 into the bore 12. As will be understood by those skilled in the art, this means that upon the operator exerting a force via a brake pedal (not shown) on a push rod 70 that the pistons 34 and 50 via the caged spring connection will be simultaneously moved to close the ports 20 and 26 and permit the development of hydraulic pressure in chambers 42 and 62 that is exhausted via ports 18 and 24 to a vehicle brake system.

With reference now to FIG. 2, the novel secondary seal 46 is shown to have an O-ring section 72 overlying a square section 74 formed with lips 76 and 78. There is, thus, provided limited areas 78 and 80 for the O-ring section and lip section, respectively, in contact with the bore wall 82 of the master cylinder housing 10. Furthermore, it should be noted that the secondary piston 34 is provided with the stepped groove having a shoulder 84 with a radiused corner 86 maintaining an upward force on the lip section 76 to provide resiliency for the contact area 80 thereof on the bore walls 82 even in the absence of pressure.

With reference now to FIG. 3 the seal 46 is shown in its free state whereby the lip section 76 projects above the uppermost height of the O-ring section 72 and the lip section 78 terminates angularly and below the lowermost surface of the square section 74. This will provide a large axial mass for the seal 46 that prevents its rolling or inversion upon assembly and permits a seal to be used that need only be compressed in the radial direction to provide a lesser area of contact in the O-ring section 72, as viewed in FIG. 2. Furthermore, the use of the square section 74 and the depending lip 78 provides a positive sealing relationship with the bottom of the groove in the piston 34 upon assembly that will limit, if not entirely eliminate, axial movement of the sealing ring in the groove upon relative movement of the contiguous surfaces of the bore wall 82 and secondary piston 34.

I claim:
1. A fluid seal comprising:
   a ring member of resilient flowable material including a
   rearward section having a one periphery of at least a
   semicircular profile at one end overlying a square section;
   a forward section integrated with the rearward section and
   having a first lip angularly extending and stopping in its
   free state beyond the free extension point of the semicircular profile of the rearward section whereby said lip axi- ally stiffens the seal and prevents its inversion on assembly, said forward section also terminating in a second lip of less length and angularly projecting therefrom to rest in its free state further from said ring than the surface of the square section of the rearward section therebehind; and said first lip having one surface flared into the profile of the rearward section and its underlying surface flared into the square section of the ring member below a plane passing through the center of the ring member in cross section.

2. A piston and seal assembly which is exposed to fluid under one pressure on one side and another pressure on the other side and including in combination:

a stepped groove in the piston of a predetermined depth at its lowest point having a rounded shoulder thereabove facing away from the side of the piston exposed to the one pressure; and an annular seal having a face with lips of differing length one of which rests on said rounded shoulder and another face comprising a rounded portion in its surface from which the longest lip projects and a square portion thereunder which forms a flat surface with the shortest lip at the bottom of the groove.

3. In a fluid motor:

a housing defining a bore therewithin;

a piston slidable in said bore;

a circumferentially extending groove in said piston;

an annular seal in said groove;

said groove being stepped to present an inner circumferential surface and an intermediate circumferential surface disposed between said inner circumferential surface and the outer circumferential surface of the piston, said inner and intermediate surfaces defining a shoulder therebetween;

said seal having a base section disposed in the portion of the groove defined by said inner surface, a lip section engaging the wall of the bore extending axially from said base section into the portion of the groove defined by said intermediate surface, and another section extending from said base section toward the wall of the bore;

the corner formed by the intersection between said shoulder and said intermediate circumferential surface engaging one side of said lip section to urge the other side of said lip section into engagement with the wall of the bore.

4. The invention of claim 3:

said corner having a radiused surface thereon for engaging said lip.

5. The invention of claim 3:

said base section being substantially rectangular in cross section to present a substantially flat lower edge engaging said inner surface.